(12) United States Patent
Devilliers et al.

(10) Patent No.: US 8,960,929 B2
(45) Date of Patent: Feb. 24, 2015

(54) DEVICE FOR CORRECTING OPTICAL DEFECTS OF A TELESCOPE MIRROR

(75) Inventors: Christophe Devilliers, Grasse (FR); Thierry Lasic, Mandelieu (FR)

(73) Assignee: Thales, Neuilly-sur-Seine (FR)

( * ) Notice: Subject to any disclaimer, the term of this patent is extended or adjusted under 35 U.S.C. 154(b) by 808 days.

(21) Appl. No.: 12/500,905

(22) Filed: Jul. 10, 2009

(65) Prior Publication Data

US 2010/0177414 A1    Jul. 15, 2010

(30) Foreign Application Priority Data

Jul. 11, 2008  (FR) ...................... 08 03980

(51) Int. Cl.
| | |
|---|---|
| *G02B 7/185* | (2006.01) |
| *G02B 7/183* | (2006.01) |
| *G02B 7/18* | (2006.01) |
| *G02B 26/08* | (2006.01) |
| *G02B 27/00* | (2006.01) |

(52) U.S. Cl.
CPC .............. *G02B 7/183* (2013.01); *G02B 7/1815* (2013.01); *G02B 26/0825* (2013.01); *G02B 27/0068* (2013.01)
USPC .............................. 359/846; 359/849; 359/872

(58) Field of Classification Search
CPC ...... G02B 5/10; G02B 26/06; G02B 26/0816; G02B 26/0825; G02B 26/0833; G02B 26/0858; G02B 26/0866; G02B 7/182
USPC ........................... 359/846, 849, 871, 872, 290
See application file for complete search history.

(56) References Cited

U.S. PATENT DOCUMENTS

| | | | | |
|---|---|---|---|---|
| 3,015,990 | A | * | 1/1962 | Jonkers .......................... 359/846 |
| 3,620,606 | A | * | 11/1971 | Tschunko ...................... 359/849 |
| 4,066,343 | A | * | 1/1978 | Scott .............................. 359/849 |
| 4,226,507 | A | * | 10/1980 | Fuschetto ...................... 359/849 |
| 4,420,222 | A | * | 12/1983 | Bret et al. ...................... 359/846 |
| 4,655,560 | A | * | 4/1987 | Glomb, Jr. ..................... 359/849 |
| 4,655,563 | A | * | 4/1987 | Plante et al. ................... 359/849 |
| 4,664,488 | A | * | 5/1987 | Sawicki et al. ................ 359/849 |
| 4,674,848 | A | * | 6/1987 | Aldrich et al. ................. 359/845 |
| 4,969,726 | A | * | 11/1990 | Koning .......................... 359/872 |
| 5,035,497 | A | * | 7/1991 | Itoh ................................ 359/849 |
| 5,162,951 | A | * | 11/1992 | Sorce ............................. 359/871 |
| 5,365,379 | A | * | 11/1994 | Sawicki ......................... 359/846 |
| 5,757,562 | A | * | 5/1998 | Apollonov et al. ............ 359/846 |
| 6,025,951 | A | * | 2/2000 | Swart et al. .................... 359/846 |

(Continued)

FOREIGN PATENT DOCUMENTS

| | | |
|---|---|---|
| EP | 1890177 A | 2/2008 |
| FR | 2773890 A | 7/1999 |
| WO | 2005026801 A | 3/2005 |

*Primary Examiner* — Ricky D Shafer
(74) *Attorney, Agent, or Firm* — Baker and Hostetler LLP

(57) ABSTRACT

A device for correcting optical defects of a telescope mirror, compatible with use in a space environment, is provided, where the criteria of weight, reliability, service life, cost and resistance to extreme temperatures are fundamental. The device comprises at least one controllable-length element, means for controlling the length of this element, this element being connected to the mirror by its ends in zones that are diametrically or diagonally opposed and close to the periphery of this mirror, the connection between the controllable-length element and the mirror comprising attachments that are rigid on the axis joining these two attachment zones and flexible in the other degrees of freedom.

2 Claims, 9 Drawing Sheets

(56) References Cited

U.S. PATENT DOCUMENTS

| | | | |
|---|---|---|---|
| 6,267,348 B1 * | 7/2001 | Perret | 248/660 |
| 6,386,714 B1 | 5/2002 | Eggleton | |
| 6,402,329 B1 * | 6/2002 | Bailly et al. | 359/872 |
| 6,715,892 B1 * | 4/2004 | Carre et al. | 359/846 |
| 6,765,712 B2 * | 7/2004 | Van Dijsseldonk et al. | 359/291 |
| 7,188,964 B2 * | 3/2007 | Ealey | 359/849 |
| 7,192,145 B2 * | 3/2007 | Ealey | 359/849 |
| 7,281,808 B2 * | 10/2007 | Knowles et al. | 359/846 |
| 7,443,619 B2 * | 10/2008 | Sakino et al. | 359/819 |
| 2004/0085657 A1 | 5/2004 | Gullapalli | |
| 2005/0248860 A1 * | 11/2005 | Soemers et al. | 359/849 |

* cited by examiner

DEVICE FOR CORRECTING OPTICAL DEFECTS OF A TELESCOPE MIRROR

CROSS-REFERENCE TO RELATED APPLICATIONS

This application claims priority to foreign Patent Application FR 08 03980, filed on Jul. 11, 2009, the disclosure of which is incorporated herein by reference in its entirety.

FIELD OF THE INVENTION

The present invention relates to a device for modifying the shape and in particular for correcting the shape of an optical surface such as a telescope mirror or any other rigid surface such as for example a reflector, and to a mirror thus equipped.

BACKGROUND OF THE INVENTION

The field of the invention is in particular, but not exclusively, that of telescope mirrors and more particularly of space telescope mirrors. In recent years, new concepts have been developed making it possible to produce new optical functions. Mention will be made, for example, of the deployment of lighter telescopes in space, the production of large-diameter telescopes based on segmented mirrors, the installation of twinned telescopes allowing the synthesis of aperture or the production of large interferometers.

Naturally, the optical aberrations and defects of these telescopes must be perfectly known and controlled so as to maintain a perfect image quality. In particular, the astigmatism of the mirrors and/or the radius of curvature must be known and corrected. In a simple manner, a mirror is called astigmatic when, in two orthogonal sectional planes passing through its centre, it has two different radii of curvature. There are various techniques making it possible to control the astigmatism. It is possible to use, for example, an active control device making it possible to modify the shape of a plurality of secondary mirrors forming a main mirror. These devices are not qualified for space applications, are very heavy, their reliability is limited and their MTBF (mean time before failure) is relatively short.

SUMMARY OF THE INVENTION

Embodiments of the present invention advantageously provide a device for modifying the shape of an optical surface, and in particular for correcting optical defects of a telescope mirror, which device is simple to apply and as cheap as possible, makes it possible to correct the astigmatism of such a mirror and, independently, the radius of curvature and the astigmatism of such a mirror and is compatible with use in a space environment, where the criteria of weight, reliability, service life, cost and resistance to extreme temperatures are fundamental.

The device for modifying the shape of an optical surface according to the invention is characterized in that it comprises at least one controllable-length element (hereinafter called a beam), means for controlling the length of this element, this element being connected to the surface by its ends in zones that are diametrically or diagonally opposed and close to the periphery of this optical surface, the connection between the controllable-length element and the surface comprising attachments that are rigid on the axis joining these two attachment zones and flexible in the other degrees of freedom.

According to a preferred application of the invention, the optical surface is a telescope mirror and the modification device is a device for correcting the optical defects of this mirror.

According to another feature of the invention, in order to independently control the radius of curvature and the astigmatism of the mirror, the device comprises a mechanical structure consisting of two elements whose length is independently controllable, means for controlling the length of these two elements, these two elements being placed at 90° relative to one another and being connected to the mirror by their ends in zones that are diametrically or diagonally opposed and close to the periphery of this mirror, the connection between the controllable-length elements and the mirror comprising attachments that are rigid on the axis joining these two attachment zones and flexible in the other degrees of freedom. The two elements may be either attached to one another at their middle, or free from one another.

According to another feature of the invention, in order to independently control the astigmatism of the mirror without modifying the radius of curvature, the device comprises a mechanical structure consisting of four substantially identical beams placed in a parallelogram and connected together by articulations, two of the apexes of the parallelogram being secured to the ends of the beam, the other two apexes being secured to the rear face of the mirror by two pivots.

The correction device according to the invention makes it possible to alleviate the aforementioned disadvantages. Its principle of operation is as follows: a straight beam made of the same material as the mirror is attached to its rear face limiting its degrees of freedom. By changing the length of the beam with appropriate means, the lengthening of the beam generates radial forces at the attachment points. Since these forces are applied at a certain distance from the centre of inertia of the mirror, they induce a tangential moment which, in its turn, modifies in a controlled manner the astigmatism of the mirror in the direction of the beam.

Advantageously, the control means comprise means for modifying the temperature of the beam relative to that of the mirror, causing a modification of the length of the beam by expansion or compression.

A variant of the invention consists in using a beam consisting of at least two substantially identical half-beams joined by a mechanical assembly comprising the control means, the said control means being devices that are piezoelectric or based on thermal actuators. If piezoelectric means are used, the mechanical assembly may comprise at least one four-apex mechanical pantograph made by means of four identical strips, the first apex connected to the first half-beam, the third apex to the second half-beam, the second and fourth apexes connected to the piezoelectric device. More precisely, the mechanical assembly may comprise four identical pantographs that are parallel with one another and connected to the two half-beams.

Advantageously, the attachment means are isostatic bipods comprising two flexible strips placed in the shape of an A forming a structure called an "A-frame", the strips being secured on the one hand to the beam and on the other hand to the rear face of the mirror.

In a particular embodiment, the correction means also comprise a mechanical structure consisting of four substantially identical beams placed in a parallelogram and connected together by articulations, two of the apexes of the parallelogram being secured to the ends of the beam, the other two apexes being secured to the rear face of the mirror by pivots.

Preferably, the beam or the half-beams or the beams substantially have the shape of a rectangular parallelepiped and are made of the same material as the mirror, this material being able to be a silicon carbide-based matrix composite structure known under the brand "Cesic®", the bipods and the pivots being made of Invar.

BRIEF DESCRIPTION OF THE DRAWINGS

The present invention will be better understood on reading the detailed description of one embodiment, taken as a non-limiting example and illustrated by the appended drawing in which.

DETAILED DESCRIPTION

Figure 1:
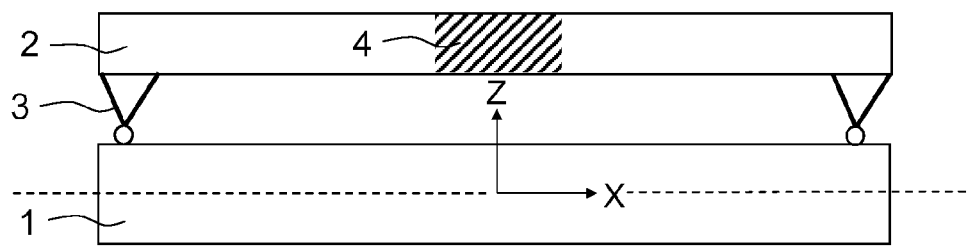
FIGS. 1 and 2 represent a front and top view of a mirror furnished with control means according to an embodiment of the invention.

The invention will now be described with reference to the drawing figures, in which like reference numerals refer to like parts throughout.

Figure 2:
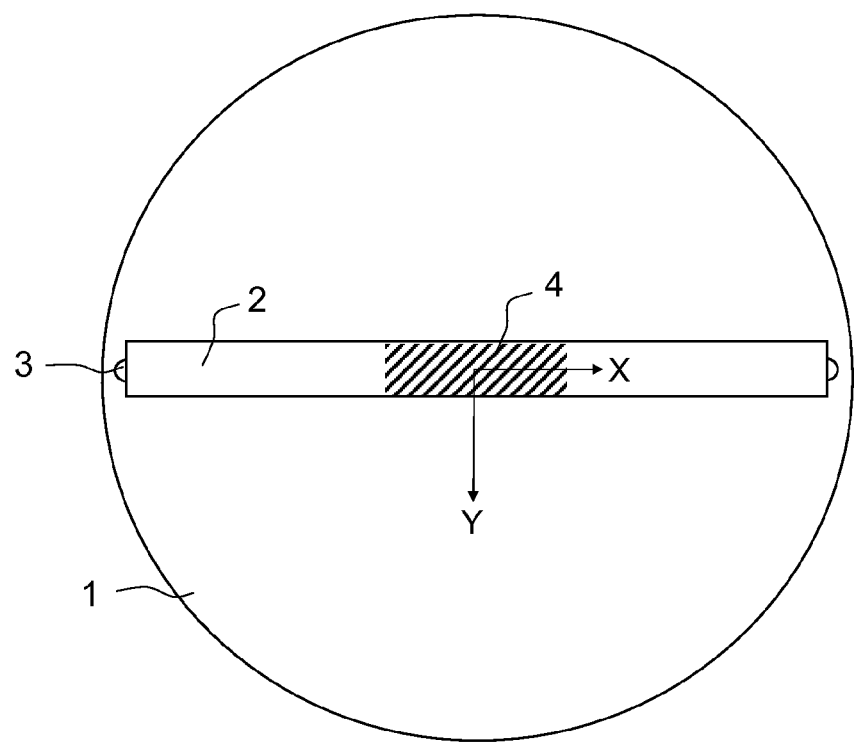

The principle of the device according to the invention is illustrated by FIGS. 1 and 2. FIG. 1 is a front view of the device and FIG. 2 a top view. In these and the following figures, the mirror shown is a circular flat mirror. Naturally, the device according to the invention may be adapted to all types of mirrors (concave or convex) and to any shape (hexagonal, square, rectangular, etc.).

In the basic version of the device of the invention, the means for correcting the astigmatism are placed on the rear surface of the mirror 1 and comprise at least one beam 2 of a length that is substantially equal to one of the main dimensions of the mirror (which is the diameter if the mirror is circular). The direction of the beam 2 is that in which it is desired to modify the astigmatism of the mirror. The beam 2 comprises, at its ends, means 3 for attaching to the rear face of the mirror. Control means 4 make it possible to modify the length of the beam 2 in a determined manner. They are represented by a cross-hatched zone in FIGS. 1 and 2.

More precisely, the attachment means 3 are bipods comprising two flexible strips 31 placed in the shape of an inverted A (see FIG. 3) and forming a flexible structure called an "A-frame", the strips being secured on the one hand to the beam at two points 32 and 33 and on the other hand to the rear face of the mirror at a third point 34, common to the two strips 31. This structure is rigid in two directions of space (directions X and Z in the plane of FIG. 3) and flexible in the third direction of space (the axis Y in FIG. 2), rotation being flexible about the third attachment point (attachment to the mirror) in the three axes of rotation.

Figure 3:
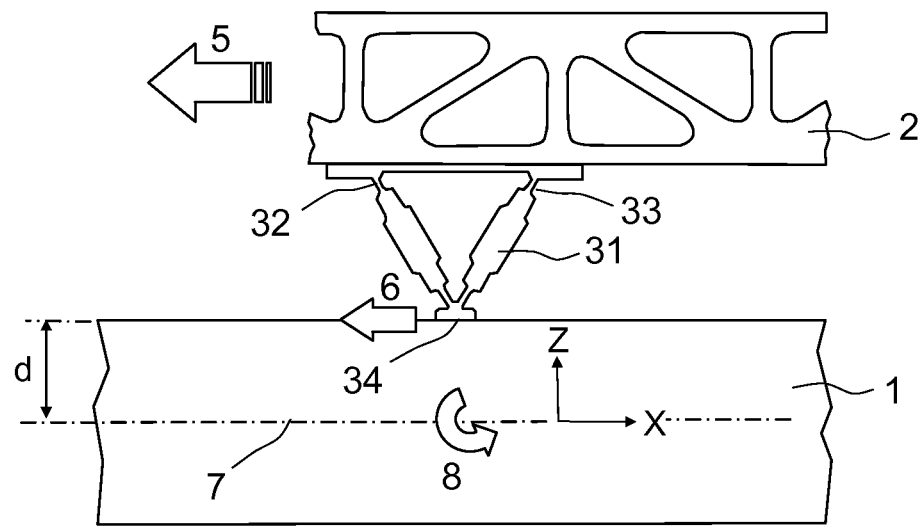
FIG. 3 represents in detail the attachment of the beam to the rear face of the mirror of FIGS. 1 and 2.

The principle of operation is illustrated in FIG. 3. When the beam sustains a variation in length (elongation or contraction, but in the rest of the text it will be mainly a question of elongation, it being understood that it may also be a contraction), and in the present case an elongation represented by an arrow 5, this elongation generates, at the point of attachment to the mirror, a force F represented by an arrow 6, which force is a function of the elongation and of the various mechanical parameters of the flexible "A-frame" attachment structure. Inside the mirror 1, there is a plane called the "neutral plane" 7 in which, when forces are applied to the mirror in this plane, this mirror sustains no bending; conversely, a force situated in a plane parallel to this plane will induce a bending of the mirror. If d is the distance from the attachment point in the neutral plane, the force 6 applies to the mirror a mechanical moment 8 equal to the product F·d which causes the mirror to deform. The force F and the distance d may be known with great accuracy either by calculation or by calibration. It is therefore possible to precisely determine, for a known elongation, the moment applied to the mirror and consequently the deformation caused. It is therefore possible, by adjusting the various parameters available (positioning and characteristics of the attachment means, elongations applied), to determine the law of deformation of the mirror in order to obtain the desired correction. The invention is described here in order to introduce knowingly and in a controlled manner a variation of shape of the optical surface of the mirror (a change of the radius of curvature and/or a change of the astigmatism) but it is understood that it could be applied, in certain cases, to the correction of optical defects of a mirror (notably very precise adaptation of the radius of curvature of the mirror), and consequently the present description relates only to the correction of defects, in the knowledge that this term applies equally well to the intentional introduction of specific deformations.

Figure 4:
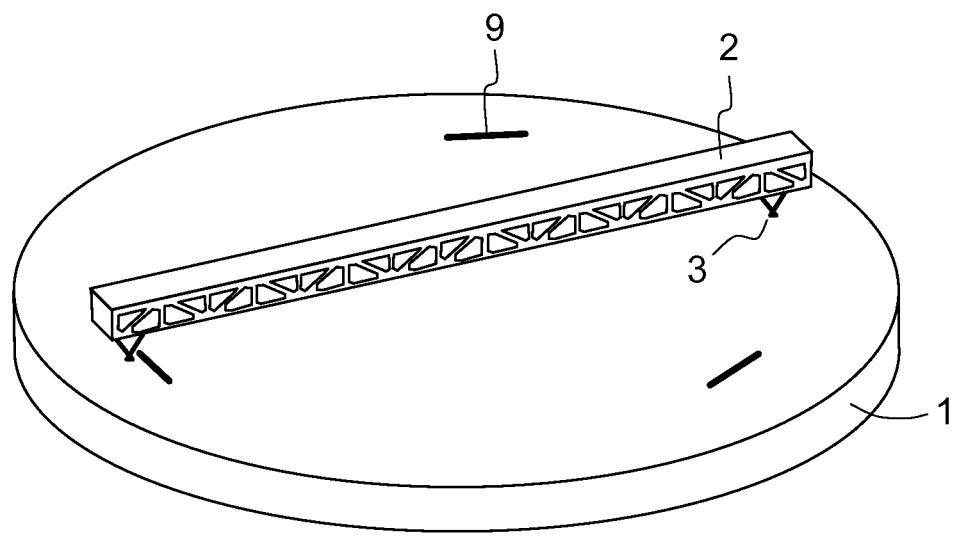
FIG. 4 is a view in perspective of a first embodiment of the control means according to the invention.

FIG. 4 represents an exemplary embodiment of the mirror 1 and of the beam 2 according to the invention. It is very important that the beam and mirror are made of the same material so as to prevent differential expansions due to the thermal variations which would risk causing spurious elongations. In this figure, the mirror 1 is circular and the beam 2 has a parallelepipedal shape. Naturally, other geometric shapes are possible. The common material may be, for example, a matrix composite structure known under the brand "Cesic®" and marketed notably by the company ECM. The main features of this material are that it has great stiffness, considerable heat conductivity, a low coefficient of expansion, a low density and a relatively low production cost. It is ideal for producing mirrors of large space telescopes. The basic material is resin-impregnated carbon fibre, all being converted into silicon carbide by reaction with silicon. The matrix mesh is typically of hexagonal shape. In FIG. 4, the three thick lines placed in a triangle at the periphery of the mirror represent the isostatic coupling system 9 of the mirror which is incorporated into the structure.

There are various means for modifying the length of the beam. It is possible to use heating elements placed on the beam, thermal expansion causing the elongation. Another possibility (shown in FIGS. 5 and 6) consists in adding a thermoelastically-controlled element between two portions of the length of the beam providing the variation in length (expansion or compression) of this element by heating elements situated on various portions of this element.

Figure 5:
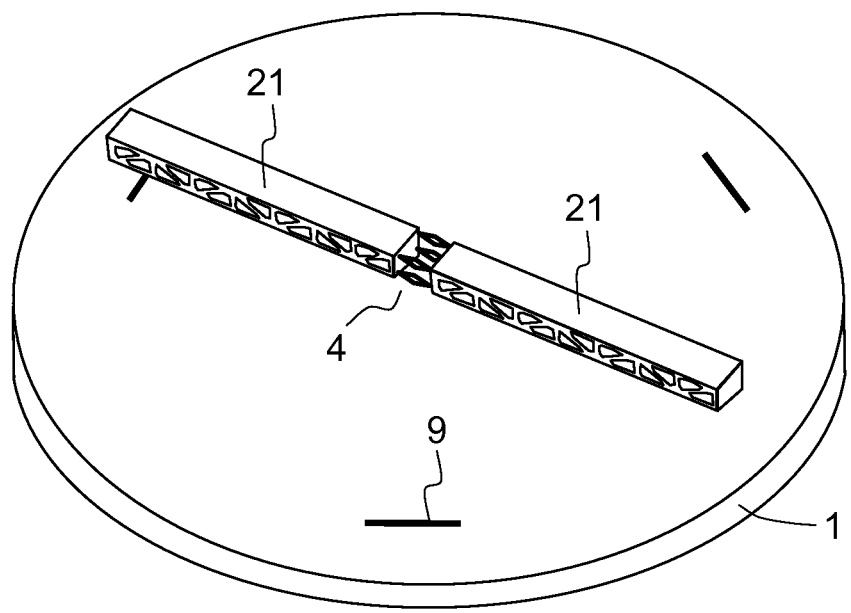
FIG. 5 is a view in perspective of a second embodiment of the control means according to the invention.
Figure 6:
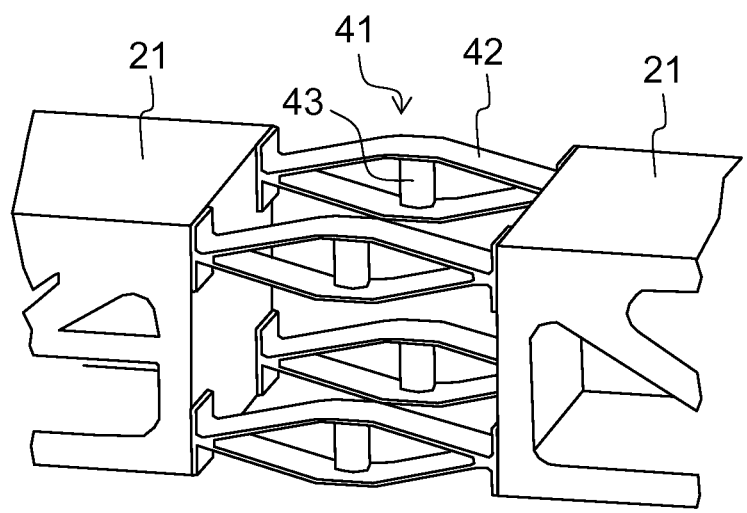
FIG. 6 represents the detail of the control means of this second embodiment.
Figure 7:
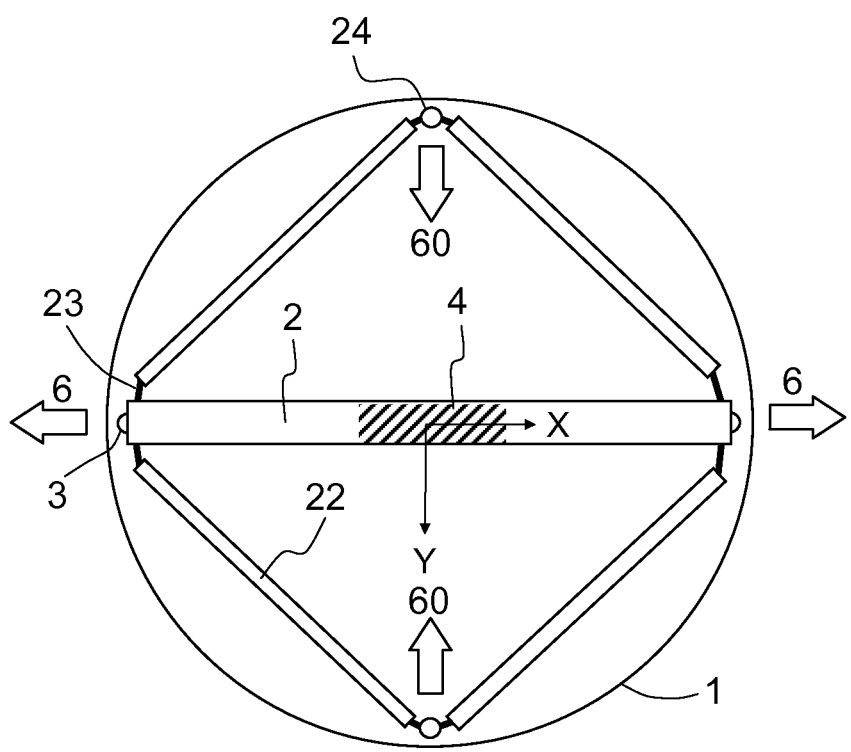
FIG. 7 is a top view of a variant embodiment of the device of the invention comprising a mechanical structure in the form of a parallelogram.

FIG. 6 is a detail view of the control means shown in the centre of FIG. 5. In these figures, the beam consists of at least two substantially identical half-beams 21 joined by a central mechanical assembly 4 comprising piezoelectric devices as the control means.

As indicated in FIG. 6, the control means 4 comprise a mechanical assembly consisting of four identical pantographs 41, parallel with one another and connected to the two half-beams 21. The pantographs are placed in a square. Each mechanical pantograph is made by means of four identical strips 42 and comprises four apexes, the first apex connected to the first half-beam, the third apex to the second half-beam, the second and fourth apexes connected to a piezoelectric device 43 whose height is electrically controlled. The strips are preferably made of Invar. This configuration has several advantages. This system prevents the stacks comprising the piezoelectric assemblies from being directly subjected to shearing forces. Moreover, it makes it possible to gear down the piezoelectric effect, thereby increasing the amplitude of elongation of the beams. Naturally, the configuration described in these FIGS. 5 and 6 may experience many variants both in the placing of the pantographs and in their arrangement while maintaining the same mechanical principle.

The system comprising a beam or an assembly of half-beams has the advantage of simplicity. It makes it possible to introduce a pure and perfectly controlled astigmatism. However, it may cause a certain lack of focus. Also, this system may advantageously be supplemented by a second mechanical structure in the form of a parallelogram designed to correct this defect, and making it possible to independently control the astigmatism and the radius of curvature of the mirror. This structure is described in FIGS. 7 to 10, FIG. 7 being a top view of the mirror comprising the said mechanical structure, FIG. 8 being a three-dimensional view of this structure and FIGS. 9 and 10 being detail views of the structure of FIG. 8.

Figure 8:
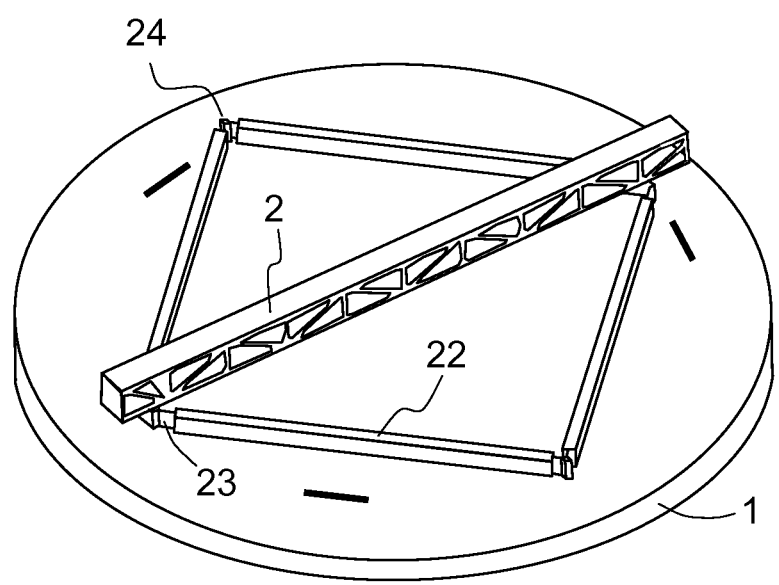
FIG. 8 is a view in perspective of the variant embodiment of FIG. 7.

As indicated in FIG. 8, the added mechanical structure consists of four substantially identical beams 22 placed in a parallelogram and connected together by articulations 23 (thick black lines in FIG. 7), two of the apexes of the parallelogram being secured to the ends of the beam, the other two apexes being secured to the rear face of the mirror by pivots 24.

When the central beam 2 lengthens, the resultant elongation generates at the points of attachment to the mirror, antagonistic forces 6 represented by two white arrows pointing in opposite directions and oriented towards the outside of the mirror (the axis X of FIG. 8), these forces being dependent on the elongation and the various mechanical parameters of the flexible "A-frame" attachment structure. The four ends of the beams secured to the beam accompany this elongation. Consequently, the other four ends "pull" on the two pivots. On each pivot, the resultant forces 60 are antagonistic, oriented towards the inside of the mirror and perpendicular to the direction of the forces 6 applied by the beam (axis Y of FIG. 8). Therefore, if the beam 2 causes a variation in curvature on the mirror in a first direction, the beams 22 cause a variation in curvature in the opposite direction. This gives a "pure" astigmatism variation, with no spurious lack of focus.

FIG. 8 shows an exemplary embodiment of this device in a perspective view. In this example, the mirror 1, the main beam 2 and the beams 22 are made of CESIC. The various pivots 24, articulations 23 and attachment means 3 connecting the elements 2 and 22 together and to the mirror 1 are made of Invar.

Figure 9:
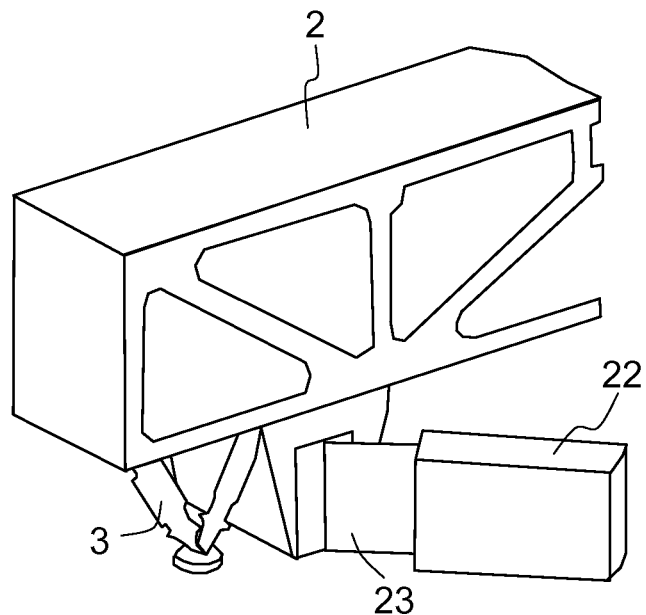
FIGS. 9 and 10 are detail views of FIG. 8.

FIG. 9 shows the detail of the device for articulating the beams to the central beam. Each articulation consists essentially of a flexible flat strip 23 made of Invar perpendicular to the rear face of the mirror and connected on the one hand to one end of the beam 2 and on the other hand to one end of the beam 22.

Figure 10:
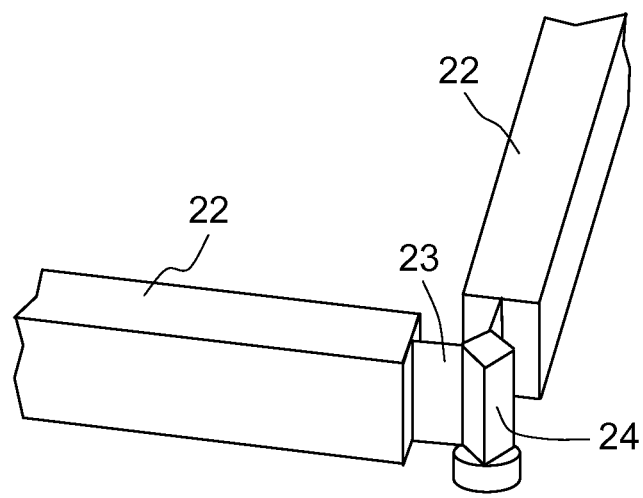

FIG. 10 shows the detail of the device for articulating the beams 22 about the attachment pivots 24. Each articulation also consists essentially of a flexible flat strip 23 made of Invar perpendicular to the rear face of the mirror and connected on the one hand to one end of the beam 22 and on the other hand to the pivot 24.

Figure 11:
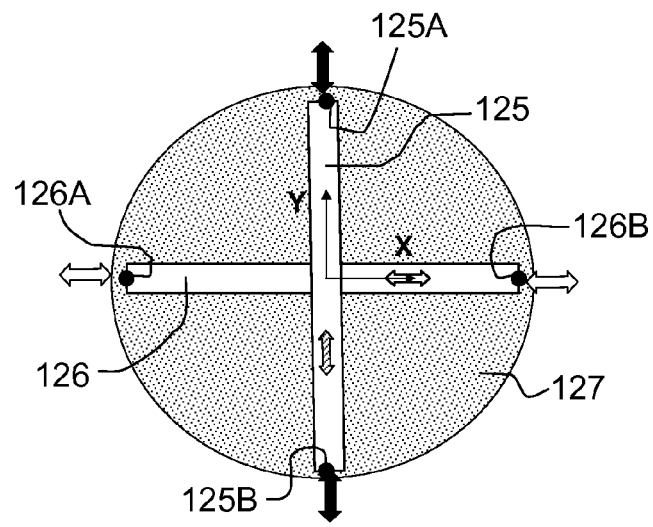
FIGS. 11 and 12 are respectively a diagram of a variant of the device of the invention making it possible to independently modify the radius of curvature and the astigmatism of a mirror, and a view in perspective of an embodiment of the beams that may be used in this variant.
Figure 12:
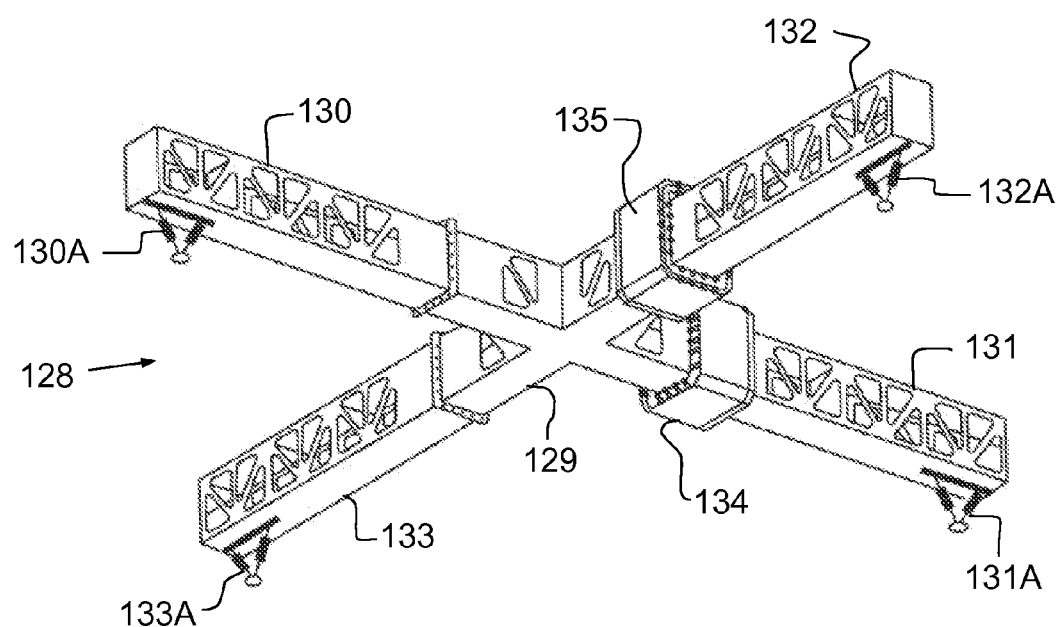

FIG. 11 is a diagram of a variant of the device of the invention making it possible to correct or modify independently the astigmatism and the radius of curvature with the aid of two beams of the type described above, an exemplary embodiment of the beams used in this variant being shown in FIG. 12.

The two beams 125, 126, of the same length, are at right angles to one another and their point of intersection coincides with the centre of the mirror 127 (circular in the present case). Each of the beams 125, 126 is connected to the mirror 127 by two bipods 125A, 125B, 126A and 126B respectively. These bipods are advantageously of the type described above with reference to FIG. 3, that is to say that they are rigid in two directions of space (directions X and Z in the plane of FIG. 3) and flexible in the third direction of space (axis Y in FIG. 2), the rotation being flexible abut the third attachment point (attachment to the mirror) in the three axes of rotation. These two beams are placed in the directions (X and Y) in which it is desired to modify respectively the astigmatism and the radius of curvature of the mirror 127. They may be joined together at their respective middles (as shown in FIG. 12) or be separated.

The assembly of beams 128 shown in FIG. 12 comprises essentially a central portion 129 in the shape of a "+", made of Cesic, at each of the ends of the branches of which is attached, for example by screwing, a section of beam, respectively 130 to 133. The sections of beam 130 and 133 (at right angles to one another) are attached directly to the central portion 129, while the sections of beams 131 and 132 are attached to this central portion by means of length-control cells 134, 135 respectively. The cell 134 controls for example the astigmatism of the mirror (not shown in FIG. 12) to which the assembly 128 is attached, while the cell 135 then controls the radius of curvature of this mirror.

Each section of beam 130 to 133 comprises, close to its free end, an isostatic bipod (similar to those described above with reference with FIG. 3), respectively 130A to 133A. These sections of beams and the central portion 129 are all advantageously made of a composite material in the manner described above. This embodiment of the beams has great rigidity in the three directions X, Y and Z, which may make it possible to dispense with a stacking device of the mirror thus fitted when the satellite fitted with this mirror is launched. The attachment of the assembly of the two beams to the mirror is not purely isostatic and it is therefore necessary to take great precautions when they are built into a satellite. However, to remedy this, it is possible to add a degree of freedom on the axis Z to one of the bipod devices.

A possible embodiment of the device for controlling the length of the beams of the device of the invention is, as specified above, of the thermal type, the material forming the beams being the same as that of the mirror, for the purpose of preventing differential elongations of the beams when the temperature falls between the ambient temperature and the cryogenic temperature of use in space. However, this advantage is limited because the coefficient of thermal expansion of Cesic is virtually zero between 20 K and 100 K which leads to a not inconsiderable increase in the general temperature of the beams. Such a temperature increase could cause the occurrence of a high thermal flux on the mirror and a steep thermal gradient between the control device with beams and the mirror, which, in its turn, would cause a local temperature gradient in the mirror. The system as described above could therefore operate only in a single direction (elongation of a single beam), which is a disadvantage when the intention is to create astigmatism and a modification in the radius of curvature in opposite directions, which is the case when movement takes place on a virtual parabola.

Other embodiments, described below with reference to FIGS. 13 to 15 make it possible to remove such disadvantages of thermal origin. These embodiments have in common both the advantage of an "athermal" concept (zero differential deformation when the mirror and the control device with beams are cooled from 300 K to 40 K approximately) and the possibility of controlling the elongation or contraction of the beams with the aid of a simple thermal-control system.

These other embodiments have in common the insertion between two portions of an interrupted beam at an appropriate location (for example at the devices 134 and 135 as shown in FIG. 12) of a compensation cell. This compensation cell is generally U-shaped with two branches parallel to one another and parallel to the two portions of the beam, which means that the total length of the beam does not vary when it sustains thermal variations in its environment (in particular when it is cooled from 300 K to 40 K). Variations in the length of the beam are obtained by heating (or cooling) only one branch of the compensation cell. Both branches of this compensation cell are for example made of a metal such as aluminium 7075, which has the advantage of having a thermal expansion coefficient that is not inconsiderable at temperatures as low as 40 K (of the order of $2.5 \times 10{-6}$ m/m° C.). In this example, if a branch 200 mm long is heated in order to increase its temperature by approximately 1° C., an elongation of 0.5 µm is obtained in this branch and therefore in the total length of the beam.

Figure 13:
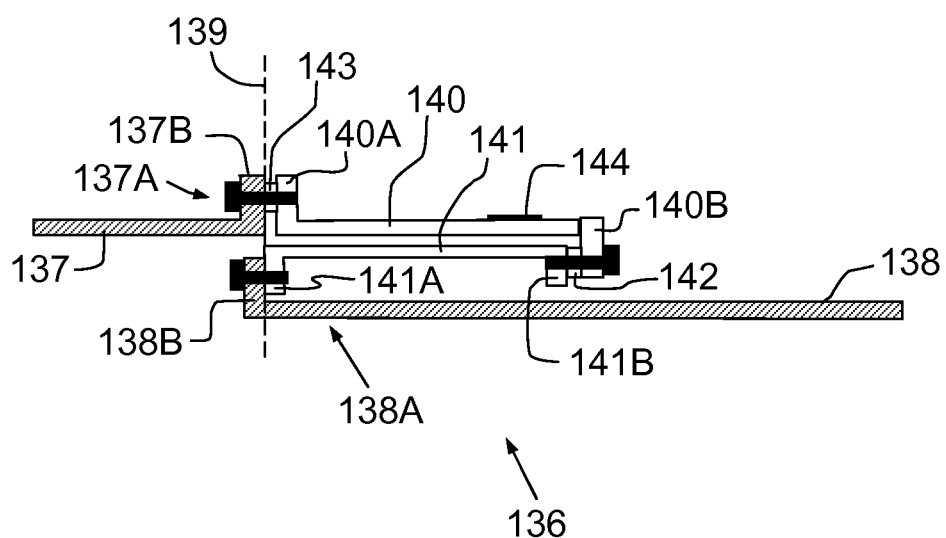
FIGS. 13 to 15 are simplified diagrams of various embodiments of the "thermal-athermal" devices for controlling the length of the beams of the device of the invention.

The compensation cell 136 schematized in FIG. 13 is inserted between two portions 137, 138 of a beam made of Cesic without modifying the total length thereof, for example as shown in FIG. 12. The ends 137A, 138A of these two portions of beam, to which the U-shaped cell is attached are placed one beneath the other and end in one and the same plane, of which the line 139 has been shown in the figure. Each of the two branches 140, 141 of the compensation cell terminates in a short attachment appendage, respectively 140A, 140B, 141A, 141B perpendicular to the corresponding branch. Similarly, the two ends 137A, 138A of the two portions of the beam terminate in attachment appendages 137B, 138B which are perpendicular thereto. The two branches 140, 141 are connected together by their appendages 140B, 141B in order to form the said "U", and they are respectively connected to the appendages 137B, 138B by their appendages 140A, 141A with the aid of screws, with interposition of thermally insulating washers 142 (between 140B and 141B) and 143 (between 137B and 140A). These thermally insulating washers are advantageously made of zirconium. An appropriate heating device 144 is placed on one of the two branches of the "U", for example on the branch 140, as shown in the drawing.

Figure 14:
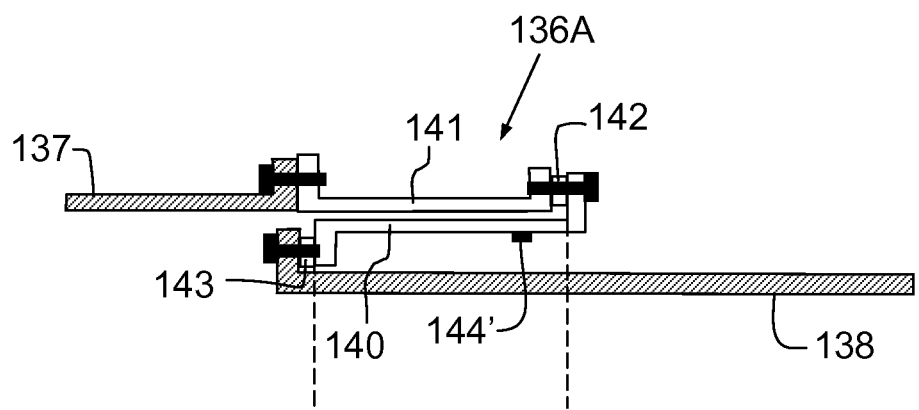

Shown in FIG. 14 is a variant 136A of the device 136 of FIG. 13. The elements that are similar to those of the device of FIG. 13 are assigned the same reference numbers. The essential difference between these two devices lies in the placement of the heating device 144', which is now placed on the branch 141', and no longer on the branch 140' (in this example, the position of the branches 140 and 141 is reversed relative to that of FIG. 13). Consequently, the thermally insulating washers 142 and 143 are placed at the junction of the two branches 140 and 141 and between the branch 141 and the portion of beam 138.

These two embodiments of FIGS. 13 and 14 show a limitation of operation in temperature due to the high thermal transmission via the washers 142, 143 between the heated portion and the unheated portions. When it is necessary to obtain contractions or elongations of great amplitude (for example greater than several µm, as is the case for imaging applications), it is naturally necessary to greatly heat or cool the corresponding branch of the "U"; this considerable thermal contribution is propagated to the beams and then to the mirror, despite the insulating washers. The embodiment of FIG. 15 makes it possible to prevent this disadvantage thanks to the addition of glass fibre strips as described below.

Figure 15:
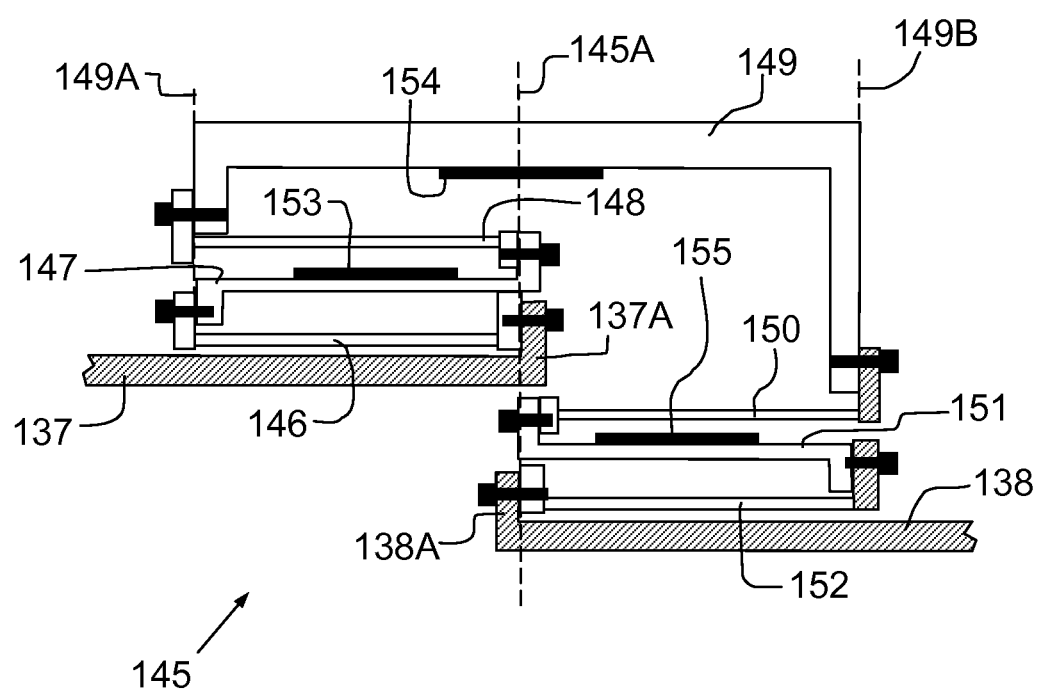

The compensation cell 145 of FIG. 15 is inserted between the two portions of beam 137, 138. The faces of the appendages 137A and 138A to which the compensation cell 145 is attached are situated in one and the same plane (perpendicular to the plane of the drawing) of which the line 145A is shown in the figure.

The cell 145 comprises, in order from the portion 137 to the portion 138, a glass fibre strip 146, an aluminium strip 147, another glass fibre strip 148, an aluminium bar 149, a glass fibre strip 150, an aluminium strip 151 and a glass fibre strip 152. The bar 149 has a length that is substantially double that of the strips 146 to 148 and 150 to 152, and the faces of its ends to which the strips 148 and 150 are attached are situated in planes parallel with one another and perpendicular to the plane of the drawing, and their respective lines are referenced 149A and 149B respectively. The strips 146 to 148 are parallel with one another, are placed one above the other and have lengths such that their respective attachment faces are alternately situated in the planes passing through the lines 145A and 149A. Similarly, the strips 150 to 152 are parallel with one another, are placed one above the other, and have lengths such that their respective attachment faces are alternately situated in the planes passing through the lines 149B and 145A. This device comprises no thermal isolation washer at the junctions between the various elements 137, 138 and 146 to 152. Thermal control devices 153, 154 and 155 are attached to the elements 147, 149 and 151 respectively. The aluminium and the glass fibre are cited above as an example, but it is understood that materials having similar mechanical and thermal qualities may be used in their place.

The device 145 produced in this way has the advantage of being able to be used over a wide range of surrounding temperatures (for example 20 to 300 K) without moving the faces for attaching the appendices 137A and 138A relative to the plane passing through the line 145A when only the ambient temperature varies, that is to say without acting on the mirror on which it is placed.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A telescope mirror comprising a device for modifying a shape of an optical surface of the mirror by acting on an astigmatism or a radius of curvature of the mirror, said device comprising:
- at least one controllable-length element,
- means for controlling a length of the controllable-length element, the controllable-length element being connected to the optical surface by respective ends in attachment zones that are diametrically or diagonally opposed and close to a periphery of the optical surface,
- each respective end connection between the controllable-length element and the optical surface comprising an attachment that is rigid along an axis joining the attachment zones and flexible in at least one other direction to provide other degrees of freedom;
- wherein the length controlling means comprises a cell for compensating for a variation in the length of the controllable-length element due to variations in ambient temperature, the cell comprising two branches forming a "U" shape, the length controlling means being placed on one of the branches, the branches being made of a material having a not inconsiderable thermal expansion coefficient at temperatures as low as 40 K.

2. The telescope mirror according to claim 1, wherein the length controlling means comprises means for modifying a temperature of the controllable-length element relative to that of the optical surface, causing a modification of a length of the controllable-length element by expansion or contraction.

* * * * *